(12) United States Patent
Wang

(10) Patent No.: US 6,639,955 B1
(45) Date of Patent: Oct. 28, 2003

(54) GENERATOR FOR COMPLEX FADING SIGNALS

(75) Inventor: Xiao-An Wang, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/376,852

(22) Filed: Aug. 18, 1999

(51) Int. Cl.$^7$ ............................................... H03D 1/04
(52) U.S. Cl. ...................................................... 375/346
(58) Field of Search .............................. 375/306, 346, 375/146–150; 455/504; 342/383; 370/335–342

(56) References Cited

PUBLICATIONS

Dent et al., Jakes Fading Model Revisited, Jun. 24, 1993, Electronics Letters, vol. 29, No. 13, pp. 1162–1163.*
Banister et al., Tracking Algorithm of the RLS Algorithm Applied to an Antenna Array in a Realistic Fading Environment, May 2002, IEEE Transactions On Signal Processing, vol. 50, pp.: 1037–1050.*
Patzold et al., Statistical Properties of Jakes' Fading Channel Simulator, May 18–21, 1998, Vehicular Technology Conference, 1998. VTC 98. 48th IEEE, vol.: 2, pp.: 712–718.*
Li et al., Modified Jakes' Model for Simulating Multiple Uncorrelated Fading Waveforms, VTC 2000–Spring Tokyo. 2000, Vehicular Technology Conference Proceedings, 2000, pp.: 1819–1822.*
"Jakes Fading Model Revisited" by P. Dent, G. F. Bottomley and T. Croft; Electronics Letters 24$^{th}$ Jun. 1993, vol. 29; No. 13.

\* cited by examiner

*Primary Examiner*—Stephen Chin
*Assistant Examiner*—Lawrence Williams
(74) *Attorney, Agent, or Firm*—Steve Mendelsohn; Ian M. Hughes

(57) ABSTRACT

A system employs a modified Jakes' fading model to generate a fading signal having substantially equivalent auto-correlation values for in-phase (I) and quadrature-phase (Q) components. A Walsh transform may be applied to generate multiple, uncorrelated I and Q components, for multiple fading signals. A complex Rayleigh fading signal according to the modified complex Jakes fading model is provided by a generator having M pairs of I and Q paths. Each pair of I and Q paths includes a corresponding complex carrier generator 201 (M an integer and $1 \leq n \leq M$) generating a complex carrier signal with frequency, $\omega_n$, where $\omega_n$ is cos $((4n-3\pi)/4M)$. Each of the I paths has a circuit that separates the real component of the corresponding carrier signal to provide a real carrier signal cos $(\omega_n t)$. Similarly, each of the Q paths has a circuit that separates the imaginary component of the corresponding complex carrier signal to provide an imaginary carrier signal sin $(\omega_n t)$. The M output signals of the circuits for the I-paths may be summed in a corresponding adder to provide in-phase component $r_I(t)$ of the fading signal r(t). Similarly, the M output signals of the circuits for the Q-paths may be summed in a corresponding adder to provide the quadrature component $r_Q(t)$ of the fading signal r(t).

19 Claims, 2 Drawing Sheets

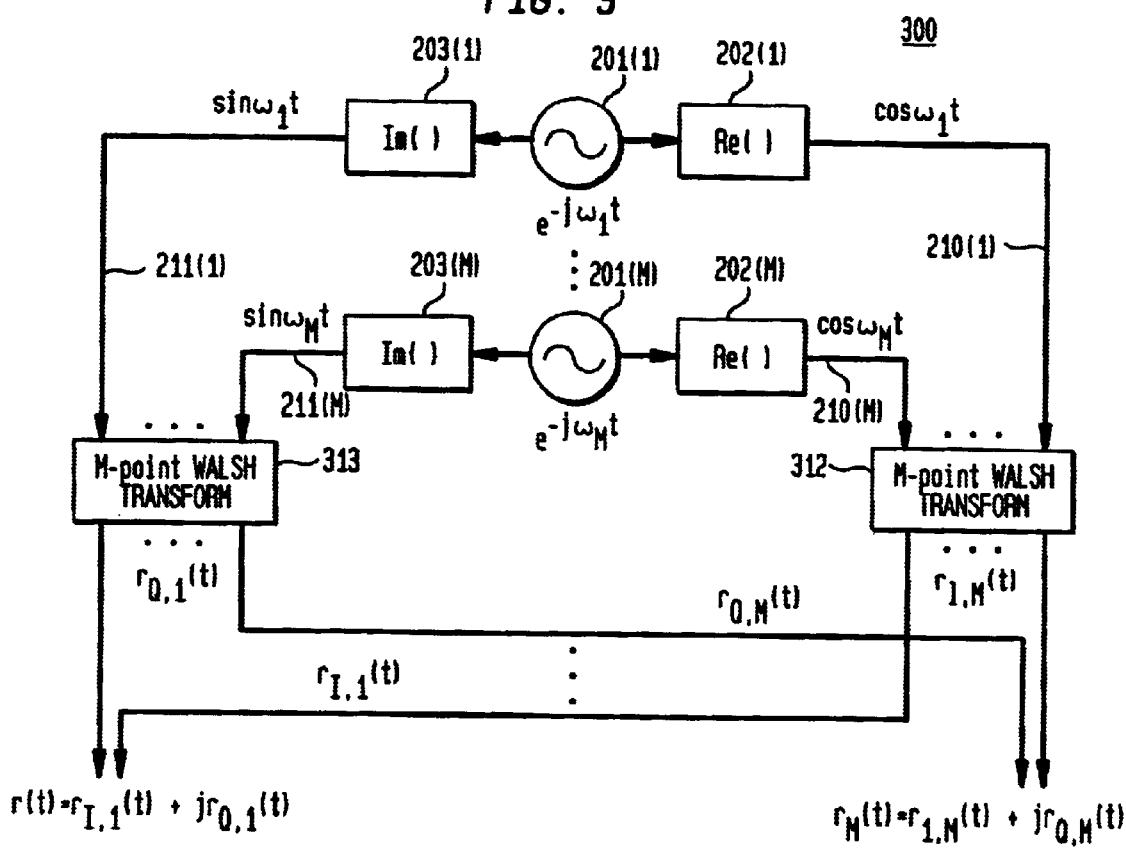

GENERATOR FOR COMPLEX FADING SIGNALS

BACKGROUND OF THE INVENTION

1. Field of the Invention

The present invention relates to generating signals in a telecommunication system, and, more particularly, to generating complex Rayleigh fading signals.

2. Description of the Related Art

Fading of a transmitted signal is a characteristic of an over-air channel of, for example, wireless, cellular, and radio telecommunication systems. Fading causes distortion of the transmitted signal with variations in signal amplitude and phase. Distortion of the transmitted signal degrades the operation of a receiver that reconstructs the data contained in the transmitted signal, affecting the reliability and quality of the communication link. Design of robust wireless or similar systems may focus on methods to reduce the effects of fading. Generating fading signals allows for simulation of the transmission channel and allows for development, performance testing, and verification of designs without extensive testing of the design in the actual field environment. Such testing is both expensive and time consuming, especially when many different design aspects are considered.

Complex Rayleigh fading signals are commonly employed for simulation and may be generated in accordance with the Jakes fading model. The in-phase (I) and quadrature-phase (Q) (fading signal) components $r_I(t)$ and $r_Q(t)$ in accordance with the Jakes fading model of the prior art are as given in equations (1) and (2). The gain parameters of equations (1) and (2) are defined in equation (3):

$$r_I(t) = \sqrt{2}\cos\alpha\cos\omega_m t + 2\sum_{n=1}^{M}\cos\beta_n\cos\omega_n t \quad (1)$$

$$r_Q(t) = \sqrt{2}\sin\alpha\cos\omega_m t + 2\sum_{n=1}^{M}\sin\beta_n\cos\omega_n t \quad (2)$$

$$\omega_n = \omega_m\cos\frac{n\pi}{2M+1}, \quad \beta_n = \frac{n\pi}{M+1}, \quad 1 \leq n \leq M \quad (3)$$

where $\omega_m$ is the fading bandwidth and $\alpha$ is a constant generally set to zero, but may take on other values for particular implementations to adjust for system and/or transmission channel characteristics.

A system of the prior art for generating complex Rayleigh fading signal components $r_I(t)$ and $r_Q(t)$ according to the Jakes fading model is shown in FIG. 1. The system 100 includes M pairs of in-phase (I) and quadrature-phase (Q) paths 110(1)–100(M) and 111(1)–111(M), respectively (M an integer and $1 \leq n \leq M$). The nth pair of I and Q paths 110(n) and 111(n) includes a corresponding signal generator 101(n) generating a signal with frequency $\omega_n$. Each of the I and Q paths 110(n) and 111(n) for the nth path pair has gain adjustment of the corresponding signal by amplifiers 102(n) and 103(n), respectively. The gain parameters for the adjustment are determined as given in equation (3). An additional path pair 106 and 114 of I and Q paths includes a corresponding signal generator 107 generating a signal with frequency $\omega_m$, and this frequency is either based on or equivalent to the fading bandwidth. Each of the I and Q paths 106 and 114 for the additional path pair has gain adjustment by amplifiers 108 and 109, respectively, with gain parameters determined as given in equation (3).

The output signals of the amplifiers 102 and 108 for all I paths are summed in adder 113 to provide the I component $r_I(t)$ of fading signal r(t). The output signals of the amplifiers 103 and 109 for all Q paths are summed in adder 112 to provide the Q component $r_Q(t)$. Adders 112 and 113 may not necessarily be employed if the addition of signals is within the transmission channel.

The advantages of generators that employ the Jakes fading model are (i) the implementation of the generator is relatively simple; (ii) some of the statistical quantities of the model generally agree with or closely approximate the characteristics of ideal channel fading; and (iii) implementations may simultaneously generate multiple fading signals uncorrelated with one another. The Jakes fading model, however, deviates from the ideal fading significantly in that the Jakes model autocorrelation values for the in-phase and quadrature components are different from one another, while the two autocorrelation values for the in-phase and quadrature components for ideal fading signals are generally equivalent.

The autocorrelation values $\phi_{rI}(t)$ and $\phi_{rQ}(t)$ for the I and Q components $r_I(t)$ and $r_Q(t)$, respectively, are given in equations (4) and (5).

$$\phi_{rI}(t) = \quad (4)$$
$$\lim_{T\to\infty}\int_0^T r_I(\tau+t)r_I(\tau)d\tau = \cos^2\alpha\cos\omega_m t + 2\sum_{n=1}^{M}\cos^2\beta_n\cos\omega_n t$$

$$\phi_{rQ}(t) = \quad (5)$$
$$\lim_{T\to\infty}\int_0^T r_Q(\tau+t)r_Q(\tau)d\tau = \sin^2\alpha\cos\omega_m t + 2\sum_{n=1}^{M}\sin^2\beta_n\cos\omega_n t$$

As given by equations (4) and (5), $\phi_{rI}(t)$ is not equivalent to $\phi_{rQ}(t)$ unless $\sin^2\beta_n = \cos^2\beta_n$ for n=1, . . . , M and $\sin^2\alpha = \cos^2\alpha$. However, for the condition that $\phi_{rI}(t)$ is equivalent to $\phi_{rQ}(t)$, $r_I(t)$ must be equivalent to $r_Q(t)$, (i.e., the fading signal has identical real and imaginary parts). For the ideal fading model, the real and imaginary components of the fading signal are desirably independent, and so these conditions are not desirable for a complex fading signal generator.

SUMMARY OF THE INVENTION

The present invention relates to generating one or more complex fading signals. A fading signal may be generated by generating in-phase (I) and quadrature phase (Q) signals for each of a plurality of complex carriers, each complex carrier having a frequency related to a fading bandwidth of the complex fading signal; and providing i) one or more of the I signals corresponding to an I component of the complex fading signal, and ii) one or more of the Q signals corresponding to a Q component of the complex fading signal. For each fading signal, the I and Q components of the complex fading signal have substantially equivalent autocorrelation values.

BRIEF DESCRIPTION OF THE DRAWINGS

Other aspects, features, and advantages of the present invention will become more fully apparent from the following detailed description, the appended claims, and the accompanying drawings in which:

FIG. 3 shows an alternative embodiment of an exemplary generator of FIG. 2 further including an M-point Walsh Transform.

DETAILED DESCRIPTION

Figure 1:
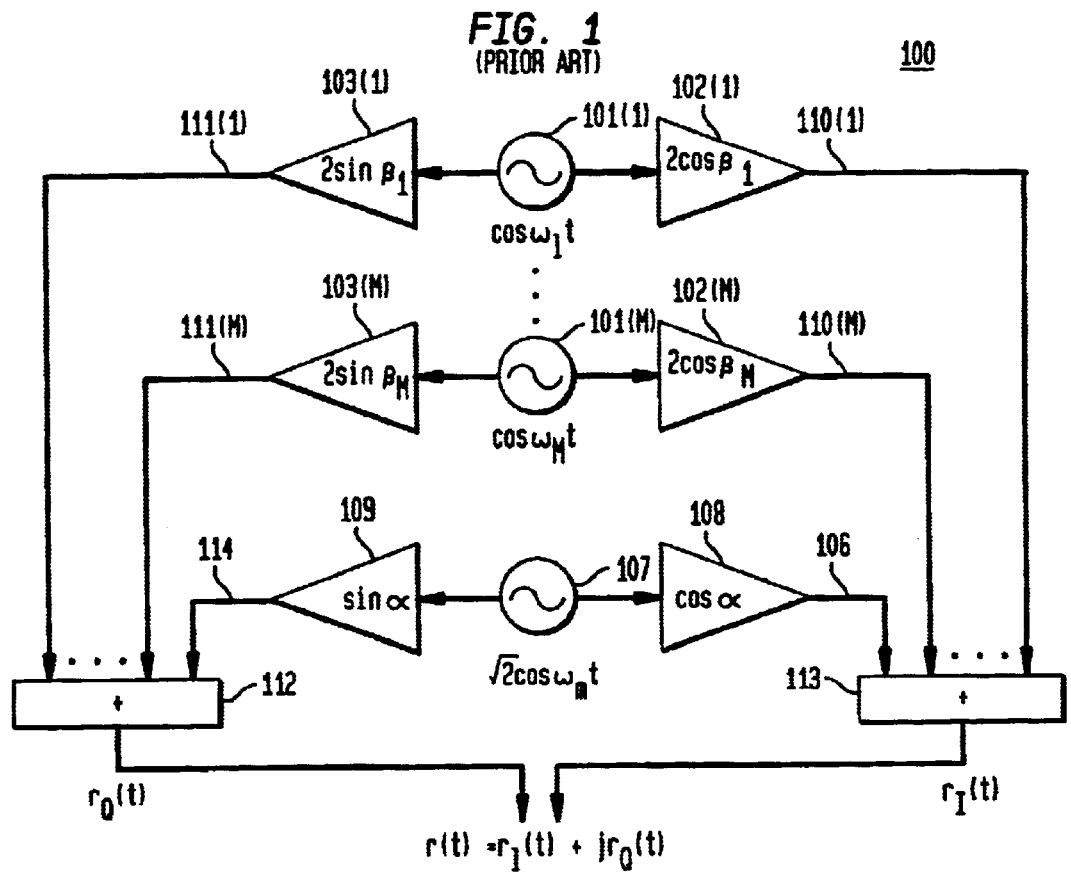
FIG. 1 shows a system for generating complex Rayleigh fading signals according to a complex Jakes fading model of the prior art.

In accordance with embodiments of the present invention, a modified Jakes fading model allows a generator to provide a fading signal having substantially equivalent autocorrelation values for the in-phase (I) and quadrature-phase (Q) components of the fading signal. For one embodiment, a single fading signal is generated, while in a further embodiment, a Walsh transform is applied to generate multiple, uncorrelated I and Q components for multiple fading signals.

In accordance with an embodiment of the present invention, the modified Jakes fading model is given in equations (6) and (7) with the frequencies for carriers as given in equation (8):

$$r_I(t) = \sum_{n=1}^{M} \cos\omega_n t \qquad (6)$$

$$r_Q(t) = \sum_{n=1}^{M} \sin\omega_n t \qquad (7)$$

$$\omega_n = \omega_m \cos\frac{4n - 3\pi}{4M}, \quad 1 \leq n \leq M \qquad (8)$$

where $\omega_m$ is either based on or substantially equivalent to the fading bandwidth.

Figure 2:
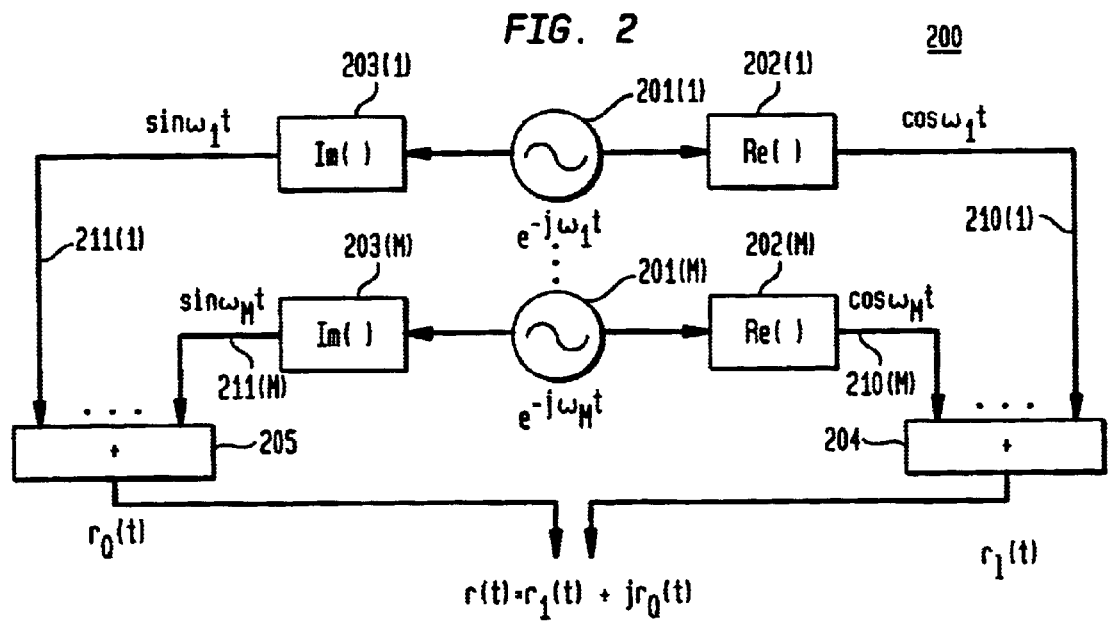
FIG. 2 shows an embodiment of an exemplary generator of complex Rayleigh fading signals according to a modified complex Jakes fading model of the present invention.

FIG. 2 shows an embodiment of an exemplary generator of complex Rayleigh fading signals according to the modified complex Jakes fading model of equations (6) through (8). The generator 200 includes M pairs of in-phase (I) and quadrature-phase (Q) paths 210(1)–210(M) and 211(1)–211(M), respectively. The nth pair of I and Q paths 210(n) and 211(n) includes a corresponding complex carrier generator 201(n) (M an integer and $1 \leq n \leq M$) generating a complex carrier signal $e^{-j\omega t}$ with frequency $\omega = \omega_n$, and $\omega_n$ may be determined as given in equation (8). Each of the I paths 210(1)–210(M) has a corresponding one of circuits 202(1)–202(M) that separates the real component of the corresponding complex carrier signal to provide a real carrier signal (e.g., cos ($\omega_n t$)). Similarly, each of the Q paths 211(1)–211(M) has a corresponding one of circuits 203(1)–203(M) that separates the imaginary component of the corresponding complex carrier signal to provide an imaginary carrier signal (e.g., sin ($\omega_n t$)). Circuits 202(1)–202(M) and 203(1)–203(M) may typically be implemented as filters.

The M output signals of the circuits 202(1)–202(M) for the I paths 210(1)–210(M) Are summed in corresponding adder 204 to provide in-phase component $r_I(t)$ of the fading signal r(t). The M output signals of the circuits 203(1)–203(M) for the Q-paths 211(1)–211(M) are summed in corresponding adder 205 to provide the quadrature component $r_Q(t)$ of the fading signal r(t).

A fading signal generated in accordance with the exemplary modified Jakes fading model of equations (6) through (8) has substantially equivalent autocorrelation values for the I and Q components $r_I(t)$ and $r_Q(t)$. For the exemplary embodiment in accordance with equations (6) through (8), the autocorrelation values $\phi_I(t)$ and $\phi_Q(t)$ for $r_I(t)$ and $r_Q(t)$, respectively, are given in equation (9):

$$\phi_I(t) = \phi_Q(t) = \frac{1}{2}\sum_{n=1}^{M} \cos\omega_n t \qquad (9)$$

As would be apparent to one skilled in the art, statistical quantities of the modified Jakes fading model, such as power spectrum density, probability distribution function of the fading signal envelope, and zero crossing rate, are similar to those of the Jakes' fading model of the prior art.

A generator of fading signals that employs the modified Jakes model of the present invention may generate multiple, uncorrelated fading signals $r_I(t)$ through $r_M(t)$, where $r_i(t)=r_{I,i}(t)+jr_{Q,i}(t)$, $1 \leq i \leq M$. FIG. 3 shows an alternative embodiment of an exemplary generator of FIG. 2 further including two, M-point Walsh transforms. As known in the art, the M-point Walsh transform applies M Walsh sequences to M corresponding signals. Signals of each of the I and Q paths may be considered vectors. Such transform may employ one value in a Walsh sequence to select a signal of a corresponding (I or Q) path, and the other signal to not select a signal of the corresponding (I or Q) path. The Walsh sequences may be defined by, for example, an M-by-M Walsh-Hadamaard matrix and are mutually orthogonal. The present invention is not limited to these Walsh sequences, however, and other orthogonal or near-orthogonal sequences may be employed. Such sequences may be generated by, for example, pseudo-noise (PN) code generators.

As shown in FIG. 3, the generator 300 applies an M-point Walsh transform in combiners 312 (for I paths) and 313 (for Q paths). Each one of the M outputs of the I paths 210(1)–210(M) is selected or not selected for combination into the output I component $r_{I,i}(t)$ based on values of a corresponding one of the Walsh sequences. Similarly, each one of the M outputs of the Q paths 211(1)–211(M) is selected or not selected for combination into the output Q component $r_{Q,i}(t)$ by values of a corresponding one of the Walsh sequences. I and Q components may be paired to form a fading signal. The fading signal may either have or not have I and Q components with corresponding, matching Walsh sequences. The M pairs of I and Q components (i.e., $r_{I,i}(t)$ and $r_{Q,i}(t)$ ($1 \leq i \leq M$)) are uncorrelated signals with respect to one another because of the orthogonality of the Walsh sequences. Preferably, the number of signal sources M should be divisible by 4 to allow for a one-to-one correspondence between carrier generators 201(1)–201(M) and Walsh sequences of the M-point Walsh transform.

Some advantages of a generator that employs the modified Jakes fading model of the present invention are as follows. First, the implementations of the generator are relatively simple, especially for integrated circuits. Second, the statistical quantities of the modified Jakes model generally closely approximate the ideal fading signal with substantially equivalent autocorrelation values of the I and Q components. Third, implementations may simultaneously generate multiple fading signals with substantially equivalent autocorrelation values for the I and Q components. Such generator in accordance with the present invention may typically be included in simulators for wireless or cellular transmission systems, such as simulators of systems operating in accordance with the IS-95 standard.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of generating a complex fading signal comprising the steps of:

(a) generating in-phase (I) and quadrature phase (Q) signals for each of a plurality of complex carriers, each complex carrier having a frequency related to a fading bandwidth of the complex fading signal; and (b) providing i) one or more of the I signals corresponding to an I component of the complex fading signal, and ii) one or more of the Q signals corresponding to a Q component of the complex fading signal, wherein the I and Q components of the complex fading signal have substantially equivalent autocorrelation values.

2. The invention as recited in claim 1, wherein step (b) comprises the step of combining each of the I signals to form the I component and combining each of the Q signals to form the Q component.

3. The invention as recited in claim 1, wherein step (b) comprises the step of selecting each I signal in accordance with values of a corresponding substantially orthogonal signal to provide the I component and each Q signal in accordance with values of a corresponding substantially orthogonal signal to provide the Q component.

4. The invention as recited in claim 3, wherein step (b) comprises the steps of i) applying an M-point Walsh transform to combine each of M pairs of I and Q signals in accordance with corresponding ones of M Walsh sequences, and ii) providing the pair combined in accordance with the corresponding ones of the Walsh sequences as the I and Q components.

5. The invention as recited in claim 1, wherein M pairs of I and Q signals are generated in step (a), $1 \leq n \leq M$ and M an integer; each pair of I and Q signals is generated in step (a) from a corresponding complex carrier having the frequency $\omega_n$ based on the fading bandwidth $\omega_m$, and the I component $r_I(t)$ and Q component $r_Q(t)$ are combined in step (b) as:

$$r_I(t) = \sum_{n=1}^{M} \cos\omega_n t, \quad \text{and}$$

$$r_Q(t) = \sum_{n=1}^{M} \sin\omega_n t, \quad \text{wherein}$$

$$\omega_n = \omega_m \cos\frac{4n - 3\pi}{4M}.$$

6. The invention as recited in claim 1, further comprising the step of employing the complex fading signal in a communication system to simulate a fading characteristic of a transmission channel of the communication system.

7. A circuit for generating a complex fading signal comprising:

a plurality of oscillators generating a plurality of complex carriers each complex carrier having a frequency related to a fading bandwidth of the complex fading signal; and a plurality of filters providing corresponding in-phase (I) and quadrature phase (Q) signals for each of a plurality of complex carriers; and wherein i) one or more of the I signals are provided corresponding to an I component of the complex fading signal, ii) one or more of the Q signals corresponding to a Q component of the complex fading signal, and iii) the I and Q components of the complex fading signal have substantially equivalent autocorrelation values.

8. The invention as recited in claim 7, further comprising a first adder for combining each of the I signals to form the I component and a second adder for combining each of the Q signals to form the Q component.

9. The invention as recited in claim 7, further comprising a transform circuit for selecting each I signal in accordance with values of a corresponding substantially orthogonal signal to provide the I component and each Q signal in accordance with values of a corresponding substantially orthogonal signal to provide the Q component.

10. The invention as recited in claim 9, wherein the transform circuit applies an M-point Walsh transform to combine each of M pairs of I and Q signals in accordance with corresponding ones of M Walsh sequences, and ii) providing the pair combined in accordance with the corresponding ones of the Walsh sequences as the I and Q components.

11. The invention as recited in claim 7, wherein M pairs of I and Q signals are generated in step. (a), $1 \leq n \leq M$ and M an integer; each pair of I and Q signals is generated in step (a) from a corresponding complex carrier having the frequency $\omega_n$ based on the fading bandwidth $\omega_m$, and the I component $r_I(t)$ and Q component $r_Q(t)$ are combined in step (b) as:

$$r_I(t) = \sum_{n=1}^{M} \cos\omega_n t, \quad \text{and}$$

$$r_Q(t) = \sum_{n=1}^{M} \sin\omega_n t, \quad \text{wherein}$$

$$\omega_n = \omega_m \cos\frac{4n - 3\pi}{4M}.$$

12. A computer-readable medium having stored thereon a plurality of instructions, the plurality of instructions including instructions which, when executed by a processor, cause the processor to implement a method for generating a complex fading signal, the method comprising the steps of:

(a) generating in-phase (I) and quadrature phase (Q) signals for each of a plurality of complex carriers, each complex carrier having a frequency related to a fading bandwidth of the complex fading signal; and (b) providing i) one or more of the I signals corresponding to an I component of the complex fading signal, and ii) one or more of the Q signals corresponding to a Q component of the complex fading signal, wherein the I and Q components of the complex fading signal have substantially equivalent autocorrelation values.

13. The invention as recited in claim 12, wherein step (b) comprises the step of combining each of the I signals to form the I component and combining each of the Q signals to form the Q component.

14. The invention as recited in claim 12, wherein step (b) comprises the step of selecting each I signal in accordance with values of a corresponding substantially orthogonal signal to provide the I component and each Q signal in accordance with values of a corresponding substantially orthogonal signal to provide the Q component.

15. The invention as recited in claim 14, wherein step (b) comprises the steps of i) applying an M-point Walsh transform to combine each of M pairs of I and Q signals in accordance with corresponding ones of M Walsh sequences, and ii) providing the pair combined in accordance with the corresponding ones of the Walsh sequences as the I and Q components.

16. The invention as recited in claim 12, wherein M pairs of I and Q signals are generated in step (a), $1 \leq n \leq M$ and M an integer; each pair of I and Q signals is generated in step (a) from a corresponding complex carrier having the frequency $\omega_n$ based on the fading bandwidth $\omega_m$, and the I component $r_I(t)$ and Q component $r_Q(t)$ are combined in step (b) as:

$$r_I(t) = \sum_{n=1}^{M} \cos\omega_n t, \quad \text{and}$$

$$r_Q(t) = \sum_{n=1}^{M} \sin\omega_n t, \quad \text{wherein}$$

$$\omega_n = \omega_m \cos\frac{4n - 3\pi}{4M}.$$

17. A simulator for simulating the characteristics of signals passing through a transmission channel, the simulator including a circuit for generating a complex fading signal comprising:

(a) generating in-phase (I) and quadrature phase (Q) signals for each of a plurality of complex carriers, each complex carrier having a frequency related to a fading bandwidth of the complex fading signal; and (b) providing i) one or more of the I signals corresponding to an I component of the complex fading signal, and ii) one or more of the Q signals corresponding to a Q component of the complex fading signal, wherein the I and Q components of the complex fading signal have substantially equivalent autocorrelation values.

18. The invention as recited in claim 17, wherein the simulator simulates the characteristics data signals transmitted through a wireless or cellular transmission channel.

19. The invention as recited in claim 18, wherein the simulator simulates transmission of data through a transmission channel in accordance with at least one of an IS-95 revision A and revision B standard.

* * * * *